United States Patent
Alvarez

(10) Patent No.: US 7,163,211 B2
(45) Date of Patent: Jan. 16, 2007

(54) SANITARY SHEATH FOR A CART HANDLE

(76) Inventor: Salvador Alvarez, 4615 Reading Dr., Oxnard, CA (US) 93030

( * ) Notice: Subject to any disclaimer, the term of this patent is extended or adjusted under 35 U.S.C. 154(b) by 0 days.

(21) Appl. No.: 10/711,973

(22) Filed: Oct. 16, 2004

(65) Prior Publication Data

US 2006/0082085 A1    Apr. 20, 2006

(51) Int. Cl.
B62D 39/00    (2006.01)

(52) U.S. Cl. .............. 280/33.992; 280/DIG. 4; 150/154; 297/219.1

(58) Field of Classification Search ........... 280/33.991, 280/33.992, DIG. 4, 33.993; 220/359.1; 150/154; 297/219.1; 40/308; 16/114.1, 16/431, 436, DIG. 24; 53/409, 410
See application file for complete search history.

(56) References Cited

U.S. PATENT DOCUMENTS

| | | | |
|---|---|---|---|
| 2,803,849 A * | 8/1957 | Peters | 16/421 |
| 3,866,649 A | 2/1975 | Bringmann | |
| 4,655,502 A | 4/1987 | Houllis | |
| 4,805,937 A | 2/1989 | Boucher et al. | |
| 4,874,096 A * | 10/1989 | Tessera-Chiesa | 383/5 |
| 4,881,746 A | 11/1989 | Andreesen | |
| D328,812 S | 8/1992 | Pritchett | |
| 5,215,319 A | 6/1993 | Farris | |
| D357,784 S | 4/1995 | Ince | |
| 5,427,392 A * | 6/1995 | Duer | 280/33.992 |
| 5,429,377 A * | 7/1995 | Duer | 280/33.992 |
| D370,110 S | 5/1996 | Beam | |
| 5,715,571 A | 2/1998 | Fasano | |
| 5,738,215 A * | 4/1998 | Weder et al. | 206/423 |
| 5,820,142 A | 10/1998 | Duer | |
| 6,065,764 A | 5/2000 | Moseley | |
| 6,543,794 B1 | 4/2003 | Tyree | |
| 6,832,766 B1 * | 12/2004 | Stokes | 280/33.992 |
| 6,869,085 B1 * | 3/2005 | Pettigrew et al. | 280/33.992 |
| 6,959,963 B1 * | 11/2005 | Hunter et al. | 297/219.12 |
| 2002/0000700 A1 | 1/2002 | Alexsen et al. | |
| 2003/0155727 A1 | 8/2003 | Pettigrew et al. | |
| 2004/0021279 A1 | 2/2004 | Sobo et al. | |
| 2004/0066070 A1 | 4/2004 | Sampson et al. | |

FOREIGN PATENT DOCUMENTS

DE    4213463    * 10/1993

* cited by examiner

*Primary Examiner*—J. Allen Shriver
(74) *Attorney, Agent, or Firm*—Patrick E. Bright

(57) ABSTRACT

A disposable sanitary sheath for a shopping cart handle featuring a sheet wrappable about the handle having a length and width so as to cover at least the portion of the handle coming into contact with a user's hands, an adhesive strip positioned about one side of a surface of the sheet for securing the sheet about the handle, a perforated pull-away strip disposed along the length of the sheet, and a pull tab accommodated on the pull-away strip. Other embodiments include disposable sanitary sheaths for shopping cart handles with a sheet wrappable about the handle wherein the sheet is made of one of the following materials: paper, polyethylene, rubber, polypropylene, vinyl, mylar, Teflon, polycarbonate, Kynar, Uvex, butyrate, F.E.P. (tetraflourethyleneperflourpropylene,) and polyester. The sheath may also be made up of two or more sheaths that are used in conjunction to cover one or more portions of a handle. Additionally, a sanitizing compound such as an antibacterial agent can be applied to the sheath.

18 Claims, 6 Drawing Sheets

SANITARY SHEATH FOR A CART HANDLE

CROSS-REFERENCES TO OTHER RELATED PATENT APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

1. Field of the Invention

The present invention relates to sanitary sheaths for use with shopping carts. More specifically, this invention relates to improvements in sanitary sheaths for carts and baskets which are both more convenient to place on a cart handle for use and easier to remove after use than previously known handle sheaths.

2. Description of Related Art

Shopping carts and baskets are used regularly to help shoppers carry items in and around stores. Because shopping cart handles are seldom cleaned, they are likely to have amounts of germs, micro-organisms, mildew, insects, viruses and other harmful substances which can be transmitted through physical contact from one user to the next. Disposable shopping cart handle sheaths give shoppers and other cart or basket users the ability to avoid this unsanitary and undesirable physical contact with the unsanitized handles.

BRIEF SUMMARY OF THE INVENTION

The present invention relates generally to disposable sanitary sheaths for shopping cart handles. One embodiment of the claimed subject matter includes a disposable sanitary sheath for a shopping cart handle comprising a sheet wrappable about said handle, said sheet having a length and width so as to cover at least the portion of said handle coming into contact with a user's hands, an adhesive strip positioned about one side of a surface of said sheet for securing said sheet about said handle, a perforated pull-away strip disposed along the length of said sheet, and a pull tab accommodated on said pull-away strip. Other embodiments include disposable sanitary sheaths for shopping cart handles with a sheet wrappable about said handle wherein said sheet is constructed of a material from the following group: paper, polyethylene, rubber, polypropylene, vinyl, mylar, Teflon, polycarbonate, Kynar, Uvex, butyrate, F.E.P. (tetraflourethyleneperflourpropylene) and polyester.

Having thus described several embodiments directed to the claimed subject matter, it is a principal object of the present invention to provide an improved disposable sanitary sheath for shopping cart handles with a perforated pull away strip and associated tab to facilitate the removal of this sheath after use.

BRIEF DESCRIPTION OF THE SEVERAL VIEWS OF THE DRAWINGS

The above and other objects, advantages and features of the claimed subject matter will be more readily apparent from the following description, when read in conjunction with the accompanying drawings wherein:

DETAILED DESCRIPTION OF THE INVENTION

Figure 1:
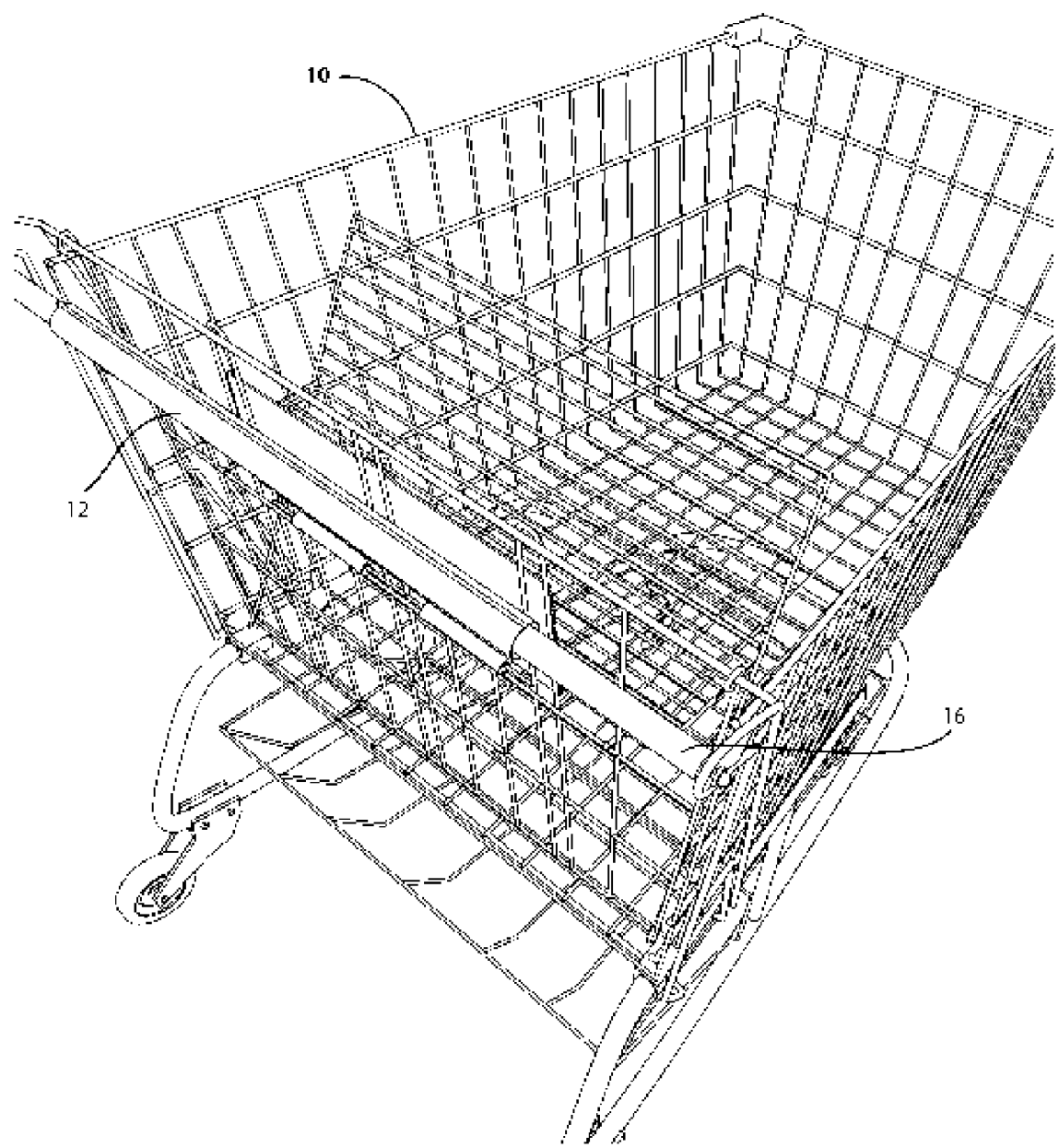
FIG. 1 is a perspective view of an embodiment of the claimed subject matter shown as used with a shopping cart.
Figure 2:
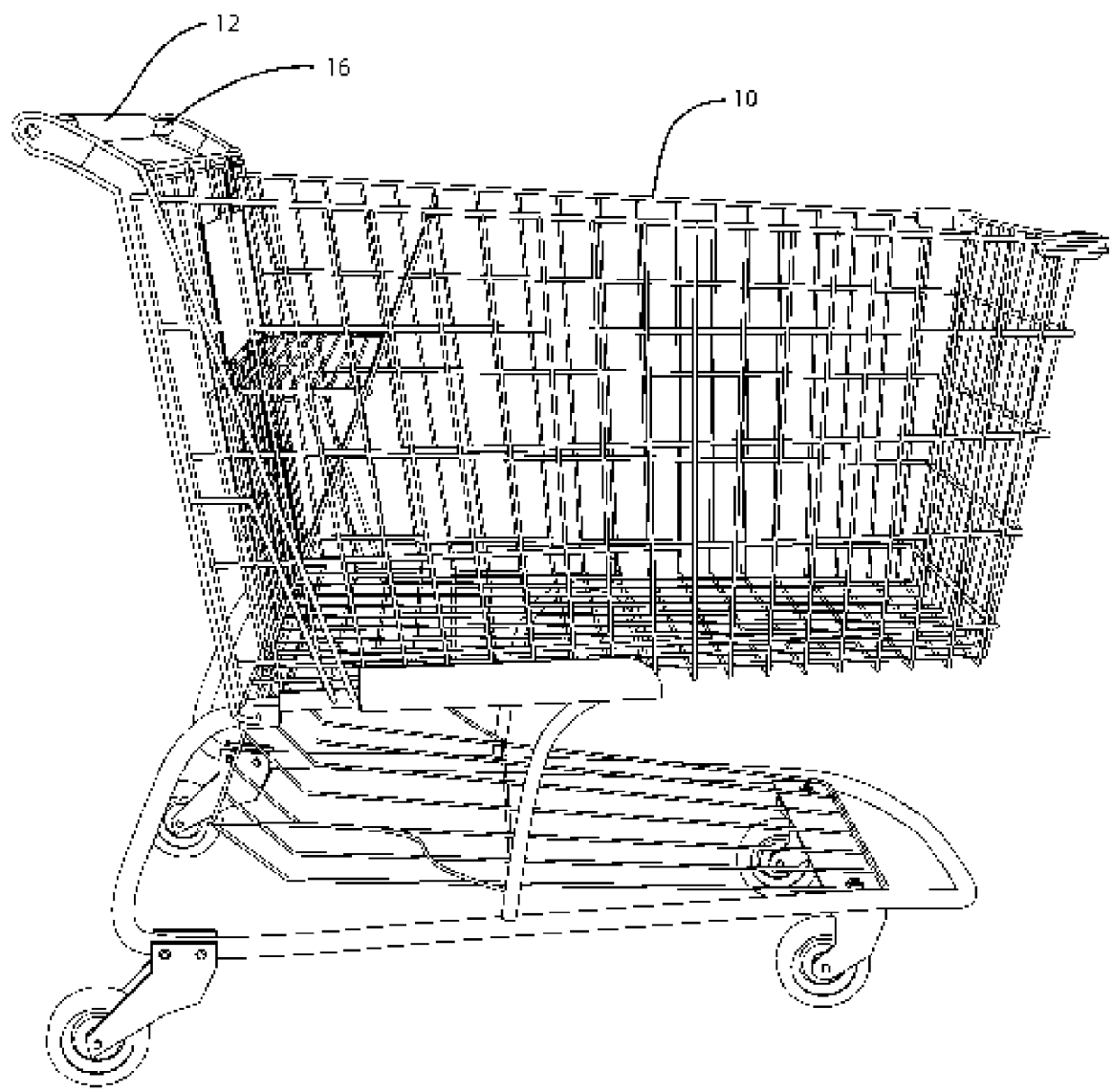
FIG. 2 is a side perspective view of an embodiment of the claimed subject matter shown as used with a shopping cart.
Figure 3:
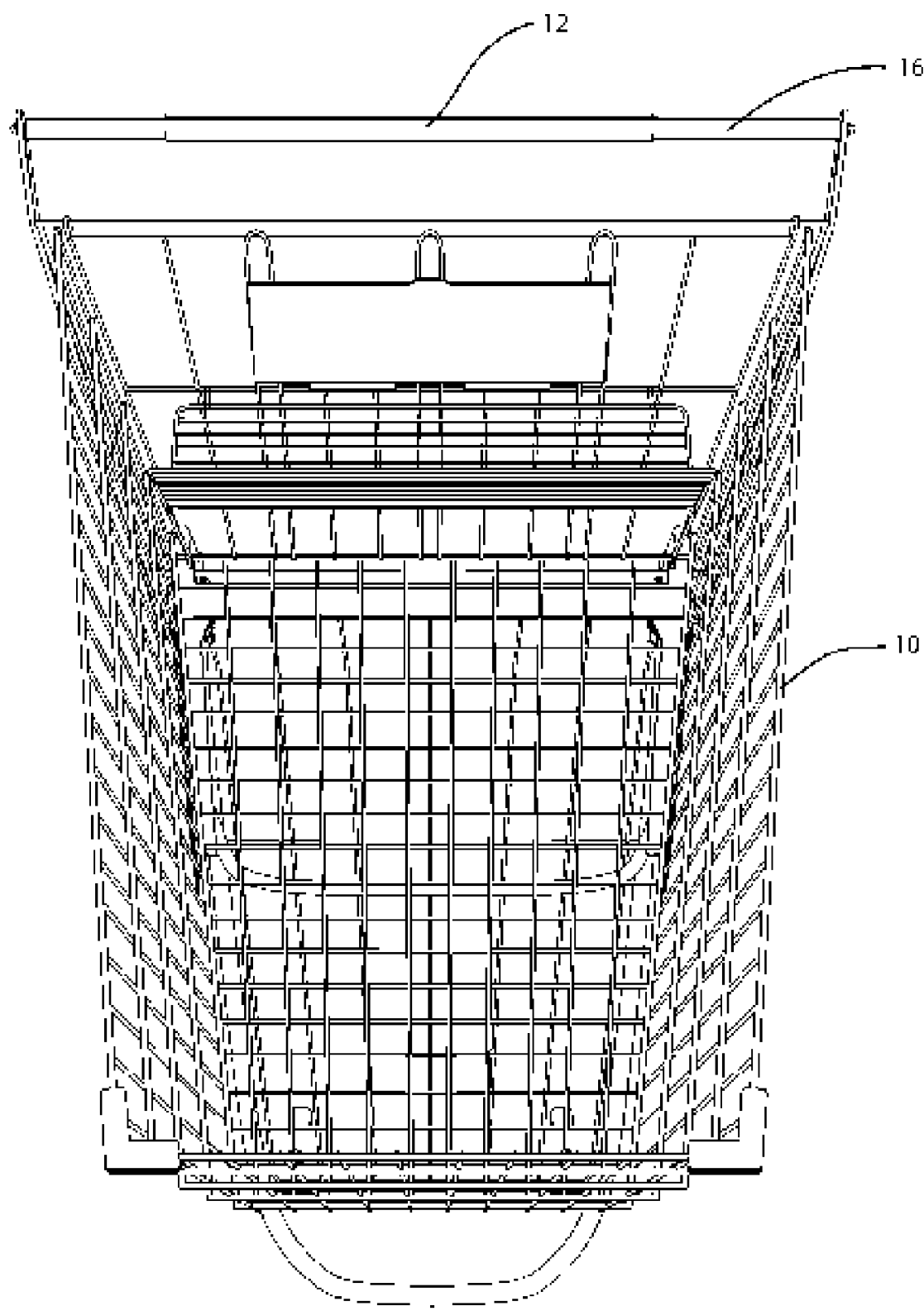
FIG. 3 is a top perspective view illustrating an embodiment of the claimed subject matter as used on a shopping cart.

Turning now descriptively to the drawings, in which similar reference characters denote similar elements throughout the views, FIGS. 1, 2 and 3 illustrate a shopping cart 10 with an embodiment of the sanitary shopping cart handle sheath that is designated generally by the numeral 12.

Shopping cart 10 as illustrated and described herein is a typical commercially available shopping cart, but the cart 10 can be any type of known cart constructed with one or more handles 16. The shopping cart handle 16 may be tubular, rectangular or any other suitable shape and it may include other portions such as a handle assembly made up of a substantially horizontal tubular handle which itself may have one or more grips. Cart 10 includes a basket portion having a bottom and a plurality of sides coupled thereto and extending upwardly therefrom, with one or more of the areas in shopping cart 10, such as the basket portion, used for storing articles. Cart 10 also includes a plurality of wheels coupled to the bottom of the cart 10 for transporting purposes.

In one embodiment, sanitary sheath 12 is constructed of a sheet 14 wrapped radially around a tubular handle 16 covering a portion or the entire handle 16. The portion of the handle 16 covered by the sheet 14 can be varied depending on the needs of the user or provider of the cart, such as adaptations for different configurations of the cart 10. For example, sheet 14 can cover only those portions of the handle where a user's hands would come into contact with handle 16, or sheet 14 can cover the entire exposed portion of handle 16. In this way, sheet 14 can have an outer surface area and length substantially similar to an area and length of the handle 16 so that direct contact between a user's hands and handle 16 are prevented thereby providing a sanitary barrier between handle 16 and the user's hands. Additionally, two or more sheaths 12 may be used in conjunction to cover one or more portions of a handle 16.

Similarly, in a wire basket embodiment, not shown, sanitary sheath 12 can be used to cover a portion of the wire basket handle or the entire wire basket handle. In a similar fashion to the shopping cart handle 16, sheet 14 can be constructed to cover one or more portions of a wire basket handle to form one or more corresponding barriers. The wire basket can be any commercially available transportable shopping basket with metal, wire, plastic, natural fiber, or any other suitable type of carrying handles that are used for carrying a basket.

Figure 4:
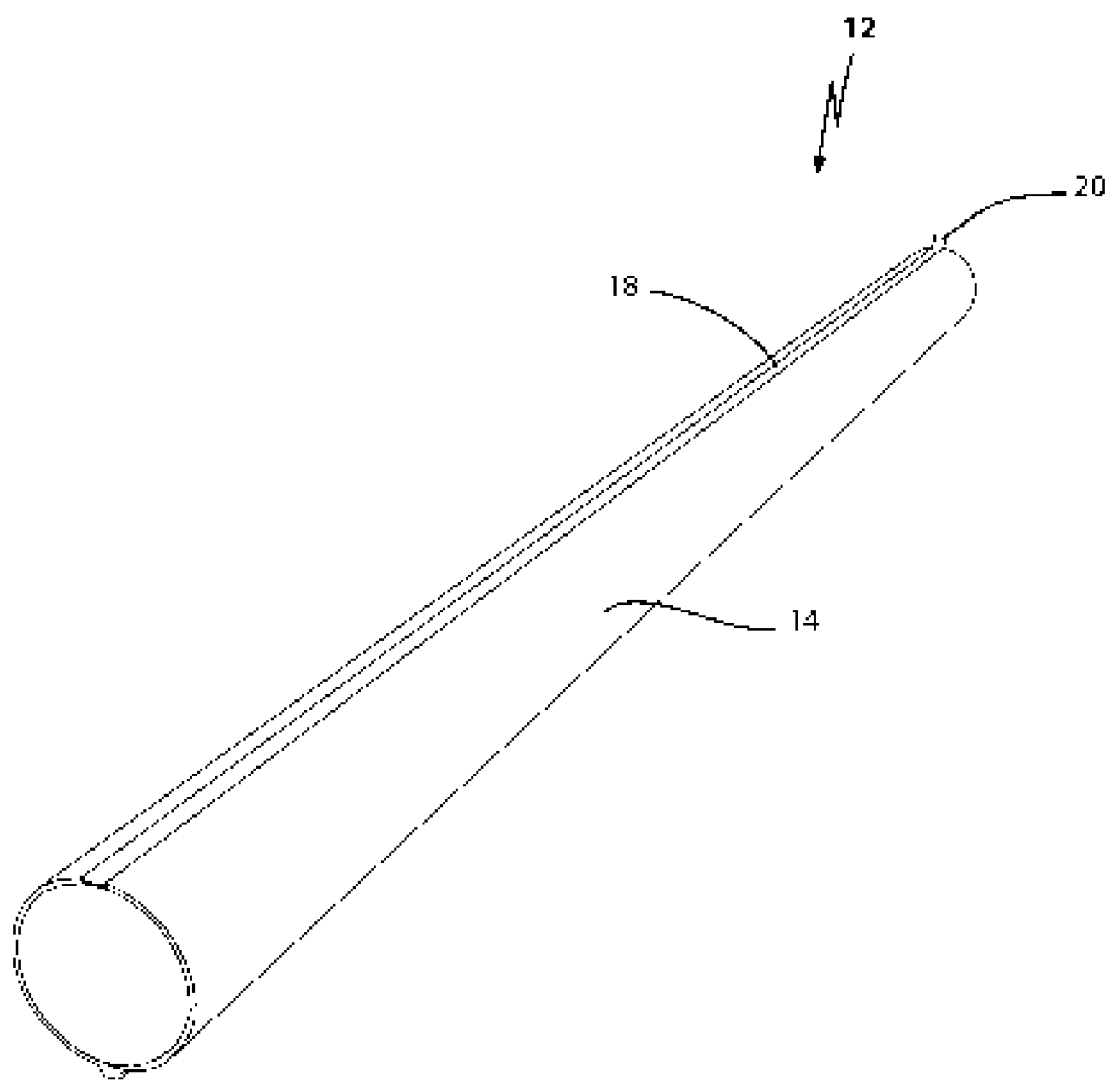
FIG. 4 is a perspective view of an embodiment of the claimed subject matter.

FIG. 4 illustrates perspective view of sheath 12 as it would be formed when attached to a handle of a shopping cart. A portion of the bottom face or side of sheet 14 has adhesive applied thereon so that the top face can be wrapped around and fastened to the bottom face. The adhesive used to secure the sheet 14 in place around handle 16 can be a tear-away adhesive or a coating of a strip of stickum which can be fixedly secured by manual pressure. FIG. 4. also shows perforated pull away strip 18 accommodated on the top of sheath 12.

Figure 5:
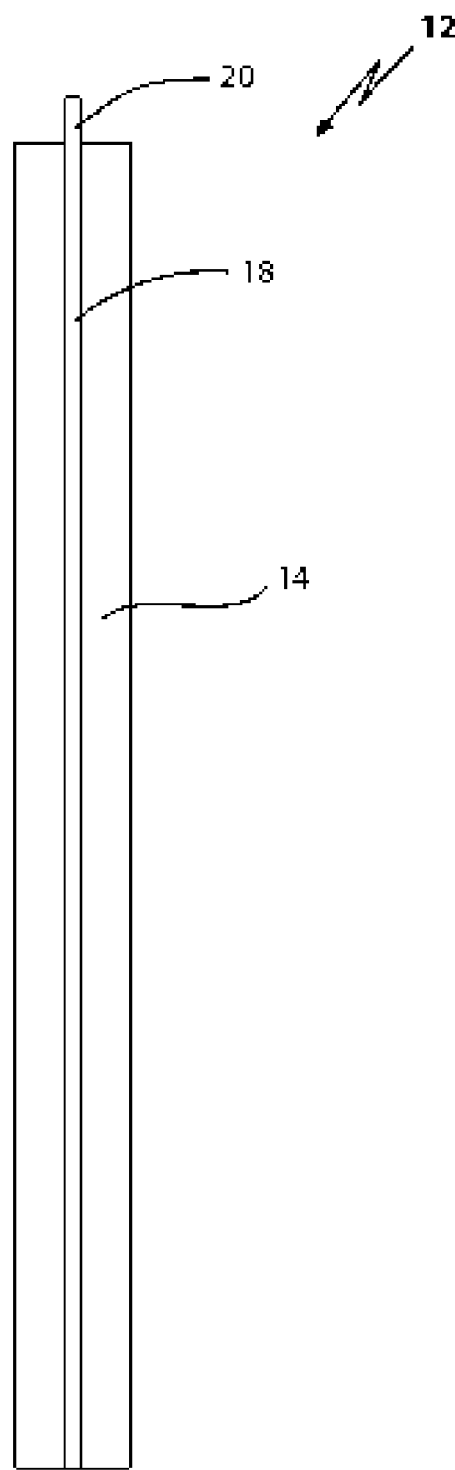
FIG. 5 is a top view of an embodiment of the claimed subject matter.
Figure 6:
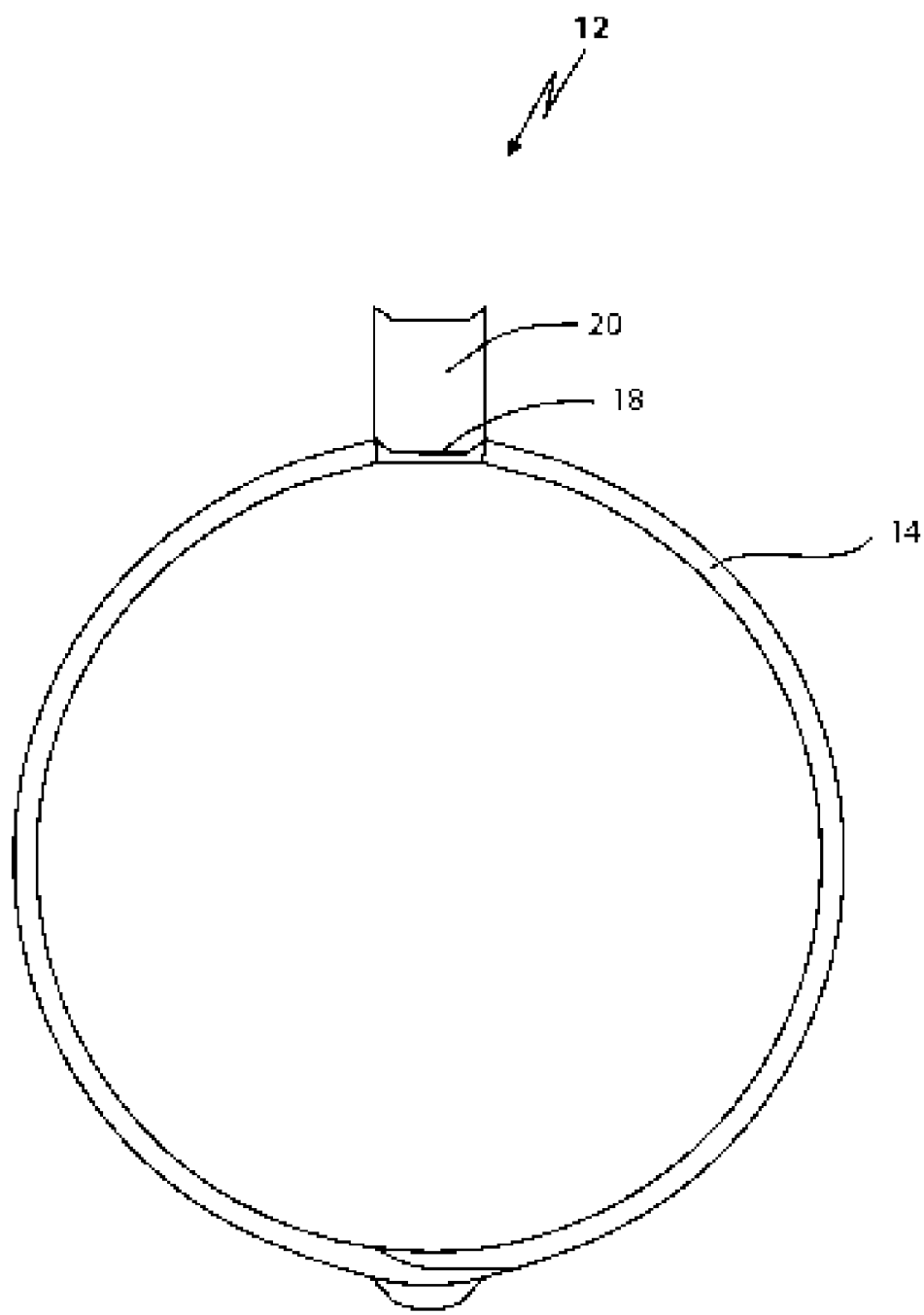
FIG. 6 is a side view of an embodiment of the claimed subject matter.

FIG. 5 illustrates a top view and FIG. 6 illustrated a side view of a sheath 12 with the perforated pull away strip 18 on the top of sheath 12 and with the pull-tab 20 accommodated on the pull away strip 18. The size and shape of the perforated pull away strip 18 may be altered to conform to the various configurations of handle 16. Similarly, the thickness of both sheet 14 and the perforated pull away strip 18 can be varied. For instance, in one embodiment, sheet 14 and/or the perforated pull away strip 18 have a thickness equal to or less than 1/16 of one inch. Sheet 14 and the perforated pull away strip 18 can be constructed of one or more materials from the following group: paper, polyethylene, rubber, polypropylene, vinyl, mylar, Teflon, polycarbonate, Kynar, Uvex, butyrate, F.E.P. (tetraflourethyleneperflourpropylene) and polyester.

While the sanitary sheath 12 is described as being used with a shopping cart 10, the sheath 12 can be used with any other similar cart-like or basket type device, such as a luggage cart or a transportable basket with handles. The present embodiments are adapted for being used handle 14 that has a grip, but the handle 14 may also not have a grip. In other embodiments, antibacterial agents or other types of sanitizing compounds may be used in conjunction with sheet 14 to further enhance the sanitary function of sheath 12.

The sanitary sheaths 12 can be stored in multiples to allow easy distribution and access by users such as in a dispensing container. Users could receive individually dispensed sheaths 12 from the dispenser for application by the user to a cart or a basket. The sheaths 12 may also be dispensed from a roll wherein they are attached together, separated by an additional perforated section, similar to other perforated plastic produce bags found on rolls in supermarkets.

After a shopping cart has been used, the shopper or an employee of the store can easily remove the sanitary sheath 12 by pulling the perforated tear away strip 18 using pull-tab 20. This pull-tab 20 allows the tear away strip 18 to be removed from sheet 14, allowing the sheet to fall away from handle 16 and be disposed of.

While the present invention has been illustrated and described by means of specific embodiments and alternatives, it is to be understood that numerous changes and modifications can be made without departing from the spirit and scope of the invention. Therefore, it should be understood that the invention is not to be limited in any way except in accordance with the appended claims and their equivalents.

What is claimed is:

1. A disposable sanitary sheath for a shopping cart handle comprising:
   a sheet wrappable about said handle;
   said sheet comprising a length and width so as to cover at least the portion of said handle coming into contact with a user's hands, and at least two parallel perforation lines that extend across said width and that form a pull-away strip when said sheet is wrapped about said handle;
   an adhesive strip positioned about one side of a surface of said sheet for securing said sheet about said handle; and
   a pull tab at one end of said pull-away strip.

2. A sanitary sheath of claim 1 wherein said sheet is made of polyethelyene.

3. A sanitary sheath of claim 1 wherein said sheet is made of rubber.

4. A sanitary sheath of claim 1 wherein said sheet is made of polypropylene.

5. A sanitary sheath of claim 1 wherein said sheet is made of vinyl.

6. A sanitary sheath of claim 1 wherein said sheet is made of polycarbonate.

7. A sanitary sheath of claim 1 wherein said sheet is made of Kynar.

8. A sanitary sheath of claim 1 wherein said sheet is made of Uvex.

9. A sanitary sheath of claim 1 wherein said sheet is made of Butyrate.

10. A sanitary sheath of claim 1 wherein said sheet is made of F.E.P. (tetraflourethyleneperflourpropylene).

11. A sanitary sheath of claim 1 wherein said sheet is made of polyester.

12. A sanitary sheath of claim 1 wherein said sheet is made of paper.

13. A sanitary sheath of claim 1 wherein said sheet is made of a plurality of sheets.

14. A sanitary sheath of claim 1 wherein two or more sheaths are to be used in conjunction to cover one or more portions of said handle.

15. A sanitary sheath of claim 1 wherein a sanitizing compound is applied to said sheath.

16. A sanitary sheath of claim 15 wherein the sanitizing compound is an antibacterial agent.

17. A sanitary sheath for a shopping cart handle comprising:
   a sheet wrappable about said handle;
   said sheet comprising a length and width so as to cover at least the portion of said handle coming into contact with a user's hands, and perforations that extend across said width and that form a pull-away section when said sheet is wrapped about said handle; and
   an adhesive strip positioned about one side of a surface of said sheet for securing said sheet about said handle.

18. A sanitary sheath of claim 17 further comprising a pull tab on said pull away section.

\* \* \* \* \*